(12) United States Patent
Ellsworth

(10) Patent No.: US 6,471,100 B1
(45) Date of Patent: Oct. 29, 2002

(54) SELF CLEANING CUSHION BOX FOR SPOUTING, WHICH TRANSFERS PRODUCTS BY GRAVITY FROM ONE POSITION TO A SECOND POSITION

(75) Inventor: Clayton S. Ellsworth, Norfolk, NE (US)

(73) Assignee: Easy Blend Manufacturing, Inc., Norfolk, NE (US)

( * ) Notice: Subject to any disclaimer, the term of this patent is extended or adjusted under 35 U.S.C. 154(b) by 0 days.

(21) Appl. No.: 09/972,149

(22) Filed: Oct. 5, 2001

(51) Int. Cl.[7] ................................. B65B 1/00
(52) U.S. Cl. ........................ 222/517; 141/286
(58) Field of Search ..................... 222/517, 533–536, 222/566; 141/286

(56) References Cited

U.S. PATENT DOCUMENTS

| 2,605,743 | A | * | 8/1952 | Scott, Jr. ................ 222/517 |
| 3,817,298 | A | * | 6/1974 | Fishburne ............... 141/286 |
| 3,885,606 | A | * | 5/1975 | Krauss .................... 141/286 |
| 4,081,004 | A | * | 3/1978 | Harris ..................... 141/286 |
| 5,893,399 | A | * | 4/1999 | Kearney .................. 141/286 |
| 6,135,171 | A | * | 10/2000 | Weakly et al. .......... 141/286 |

* cited by examiner

Primary Examiner—J. Casimer Jacyna

(57) ABSTRACT

A cushion box for adjustably cushioning particulate material in a spouting arrangement includes a hollow tubular housing with an outlet opening disposed below an inlet opening, and a movable baffle disposed in the housing.

8 Claims, 5 Drawing Sheets

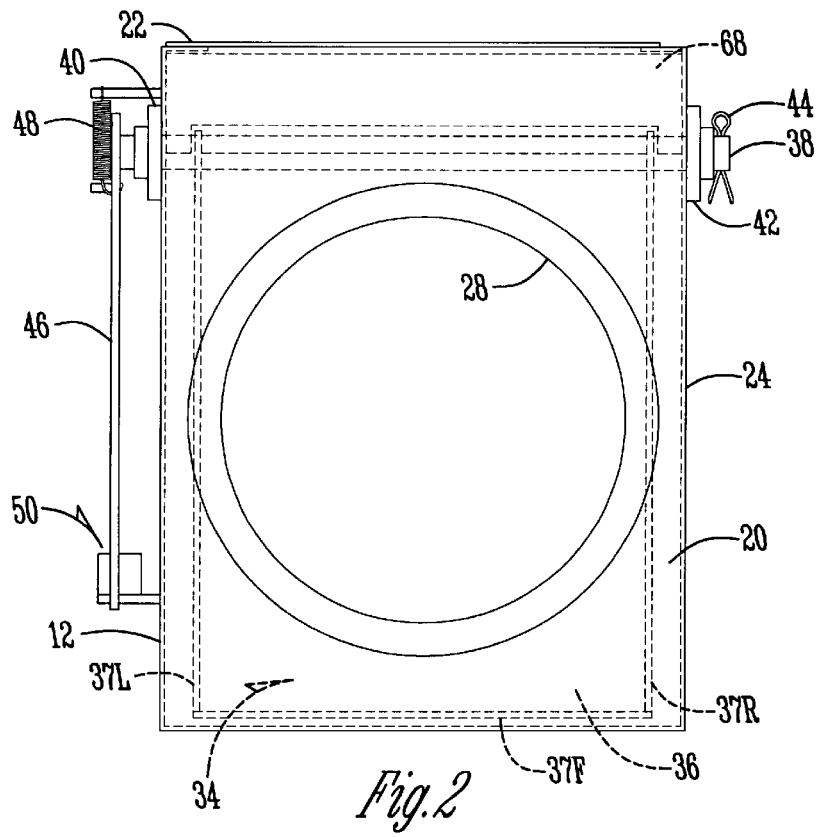
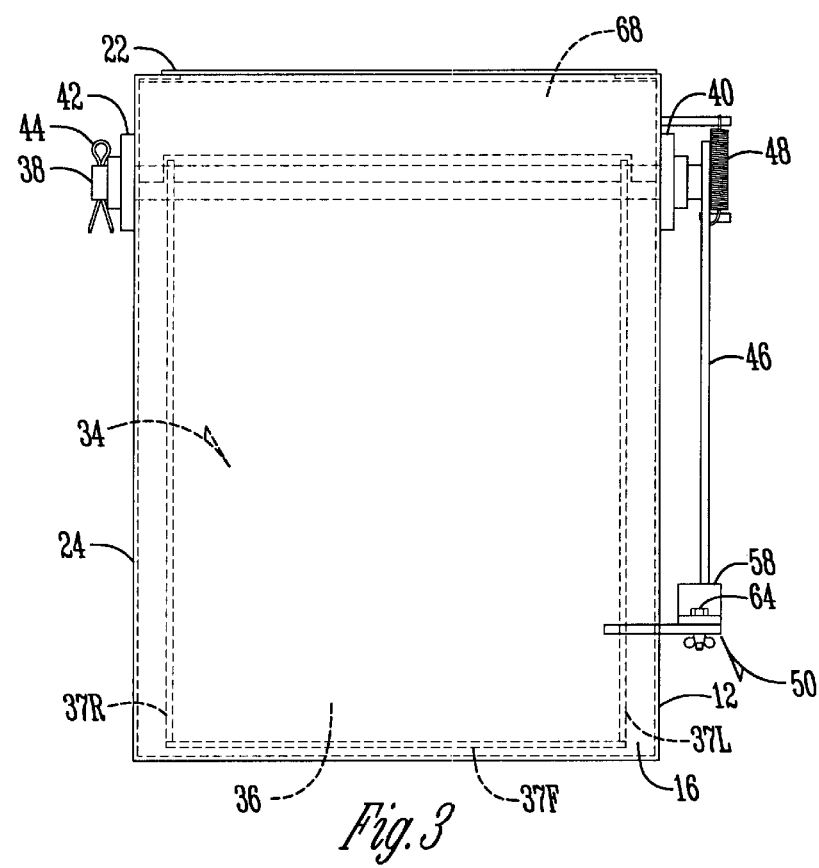

SELF CLEANING CUSHION BOX FOR SPOUTING, WHICH TRANSFERS PRODUCTS BY GRAVITY FROM ONE POSITION TO A SECOND POSITION

BACKGROUND OF THE INVENTION

The present invention relates to the field of spouting arrangements for gravity feeding particulate materials, including but not limited to grain and other bulk particulate products. More particularly, this invention relates to a cushion box with an adjustable baffle for use in such spouting arrangements.

In general, conventional cushion boxes are well-known and have been used in gravity fed spouting arrangements for particulate materials or products, including but not limited to corn, limestone, soybean meal, wheat mids, and meat scraps. Heretofore, two common types of cushion box designs have been used: a "deadhead" design and a "fixed plate" design. The deadhead design involves capping a portion of the spout or pipe downwardly adjacent a flow junction. The product accumulates in the dead portion of the capped pipe and cushions the impact of subsequent product that lands on it. Unfortunately, product tends to stagnate and build up over time. As the product builds up and hardens in the capped pipe, the cushioning effect is reduced. Eventually very little cushioning occurs and the capped portion merely helps reduce spout wear in the plugged or capped area.

The fixed plate cushion box design includes a fixed plate spaced above the bottom of the outlet opening. The fixed plate accumulates product but allows some product to escape. This design is also subject to becoming plugged with foreign material or contaminates; at which time it simply becomes a deadhead type as described above. Neither type of conventional cushion box allows the user to control the timing of the cushioning effect. Thus, there is a need for a cushion box that provides consistent and reliable cushioning effect over time to protect the product and eliminate spout wear.

Therefore, a primary objective of the present invention is the provision of an improved cushion box for use in a spouting arrangement for gravity feeding particulate materials or products.

A further objective of the present invention is the provision of a self-cleaning cushion box.

A further objective of the present invention is the provision of a cushion box with a movable baffle therein.

A further objective of the present invention is the provision of a cushion box with an externally adjustable baffle therein.

A further objective of the present invention is the provision of a cushion box wherein the baffle can be pivotally raised to a full open position in which no product cushioning takes place.

A further objective of the present invention is the provision of a cushion box wherein the baffle can be pivotally lowered to a bypass flow position.

A further objective of the present invention is the provision of a cushion box wherein an adjustable stop limits the position of the baffle.

These and other objectives will become apparent from the drawings, as well as from the description and claims that follow.

BRIEF SUMMARY OF THE INVENTION

The present invention relates to the field of spouting arrangements or gravity feeding particulate materials, including but not limited to grain and other bulk products. The invention is a cushion box with an adjustable, externally movable baffle. The cushion box includes a hollow tubular housing with an outlet opening disposed below an inlet opening, and a movable baffle disposed in housing. The baffle is selectively movable into a plurality of positions within the housing. In some of the positions the baffle extends partially between the inlet opening and the outlet opening so as to cushion particulate products delivered by the spout to the inlet opening.

The baffle preferably pivotally mounts to the housing and includes a baffle plate attached to a pivot shaft rotatably mounted in the housing. An elongated control arm drivingly connects to the pivot shaft and extends external to the housing. An adjustable stop mounts on the housing so that the user can selectively control the position of the control arm or handle, and thereby the position of the baffle.

BRIEF DESCRIPTION OF THE DRAWINGS

FIG. 2 is a view of the cushion box of this invention taken along line 2—2 in FIG. 1.

FIG. 3 is a view of the cushion box of this invention taken along line 3—3 in FIG. 1.

DETAILED DESCRIPTION OF THE INVENTION

Figure 1:
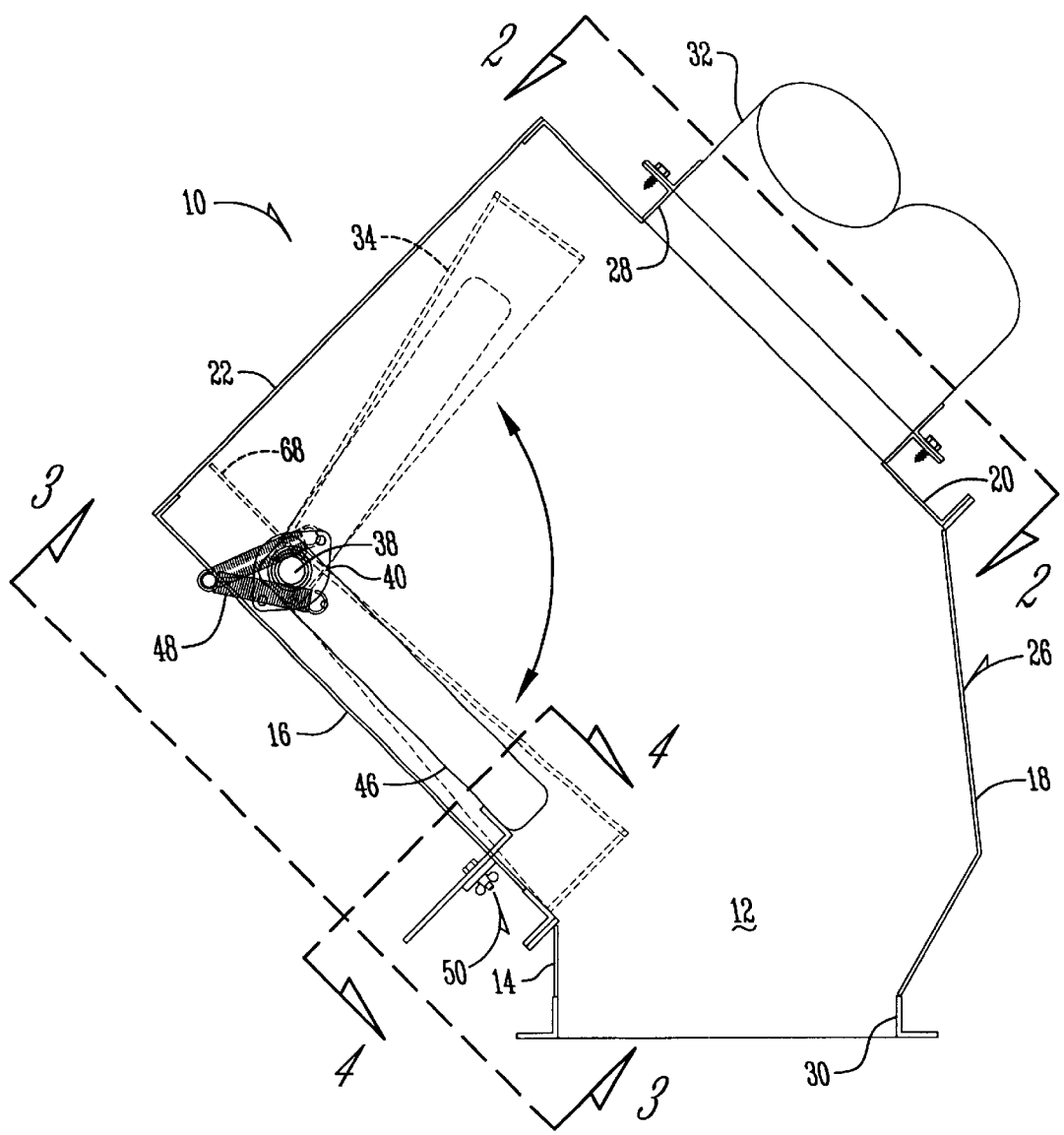
FIG. 1 is a front elevation view of the cushion box of the present invention.

In FIGS. 1–3, the cushion.box of the present invention is generally designated by th e reference numeral 10. The cushion box 10 has a substantially rigid exterior skin formed of sheet metal or other suitably strong and impermeable material. The box 10 includes one or more walls or panels 12, 14, 16, 18, 20, 22, and 24 joined together in a conventional manner. The panel 22 detachably attaches to panels 12, 16, 20 and 24 so that it can serve as a removable top access panel for clearing any foreign material or debris from the cushion box 10. Although the cushion box 10 has a rectangular shape as illustrated in the figures, other shapes are possible without detracting from the invention.

Together the panels 12, 14, 16, 18, 20, 22, and 24 define a hollow tubular housing 26. The hollow tubular housing 26 has an inlet opening 28 and an outlet opening 30. The inlet opening 28 connects to a spout 32 for delivering particulate products, including but not limited to corn, limestone, soybean meal, wheat mids, and meat scraps. Although the inlet opening 28 and spout 32 have a circular cross-section in the preferred embodiment illustrated, other shapes will suffice without detracting from the invention. Likewise, the outlet opening 30 can be substantially rectangular as shown, or some other shape such as circular, oval, etc. without detracting from the invention. The outlet opening 30 resides below the inlet opening 28 so that particulate products delivered by the spout 32 fall by gravity from the inlet opening 28 to the outlet opening 30.

A movable baffle 34 mounts in the housing 26, preferably pivotally with respect to the housing 26. The baffle 34 includes a formed baffle plate member secured by welding or other conventional means to a pivot shaft 38 for rotation therewith. The baffle plate member has a top 36, opposite sides 37L, 37R and a front 37F. The sides 37L, 37R and the front 37F are bent downwardly in the forming process so that they extend downwardly from the top 36 as shown. The sides 37L, 37R have holes 35L, 35R therein for receiving the shaft 38. The baffle top 36 is preferably long and wide enough to extend partially between the inlet. opening 28 and the outlet opening 30 to cushion particulate material delivered by the spout 32.

Bearings 40, 42 attached to the panels 12, 24 respectively rotatably support the pivot shaft 38 in the hollow tubular housing 26, as best seen in FIG. 2. A cotter pin 44 or a similar-conventional securement means prevents the pivot shaft 38 from sliding axially from the housing 26 in one direction. The opposite end of the pivot shaft 38 extends through the bearing 40. An elongated control arm or handle 46 has a first portion that drivingly connects to the pivot shaft 38 by welding or other conventional means. A spring biasing means such as a tension spring 48 connects to the housing 26 and the handle 46 as shown. The tension spring 48 has one end connected to the handle 46 at a first point offset from the pivot shaft 38 and another end connected to the housing 26 at a second point offset from the pivot shaft 38.

Figure 4:
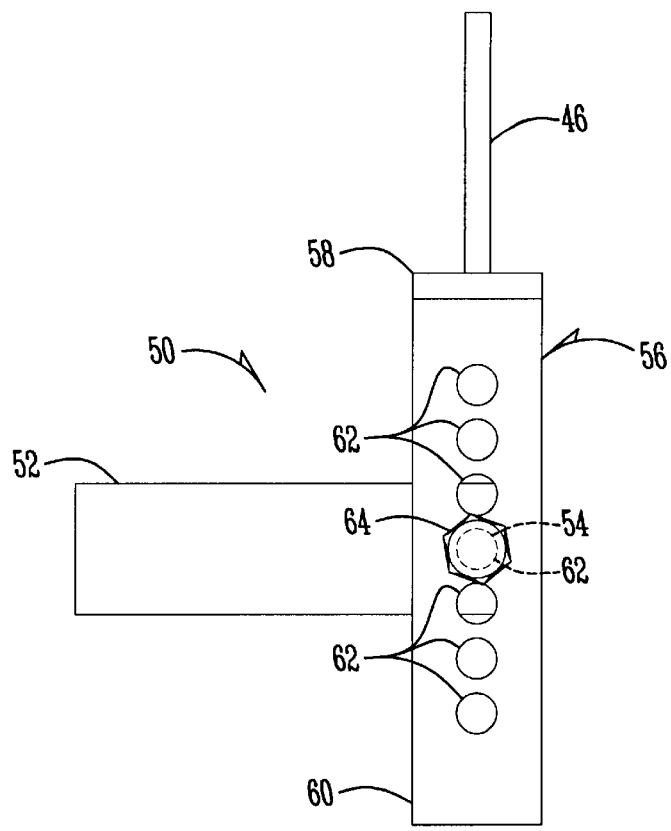
FIG. 4 is a view taken along line 4—4 in FIG. 1 and shows the adjustable stop of this invention in greater detail.
Figure 4A:
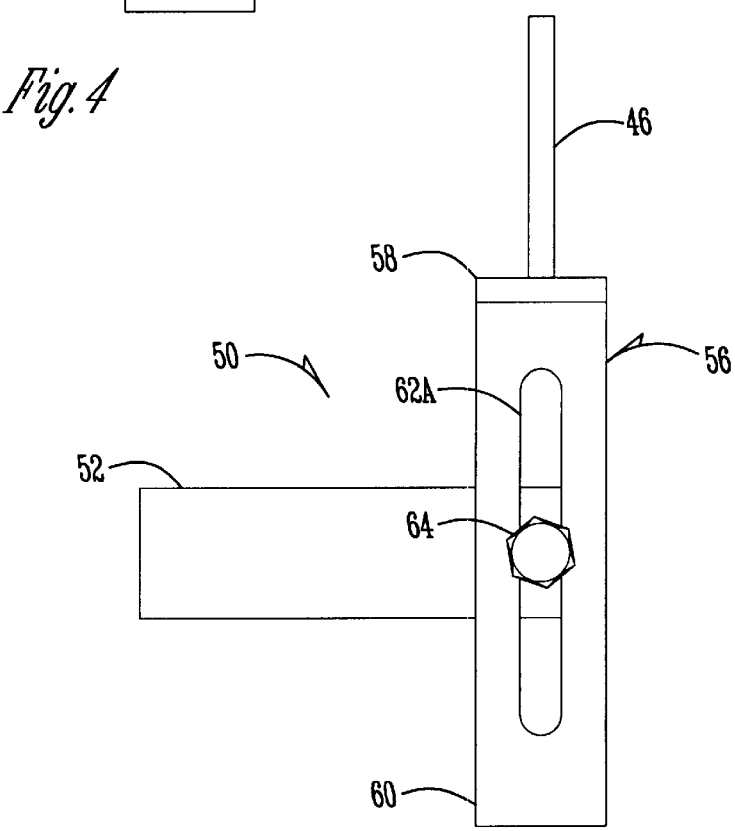
FIG. 4A is similar to FIG. 4 but shows an alt ernative embodiment of the invention wherein the adjustable stop has an adjustment slot.
Figure 5:
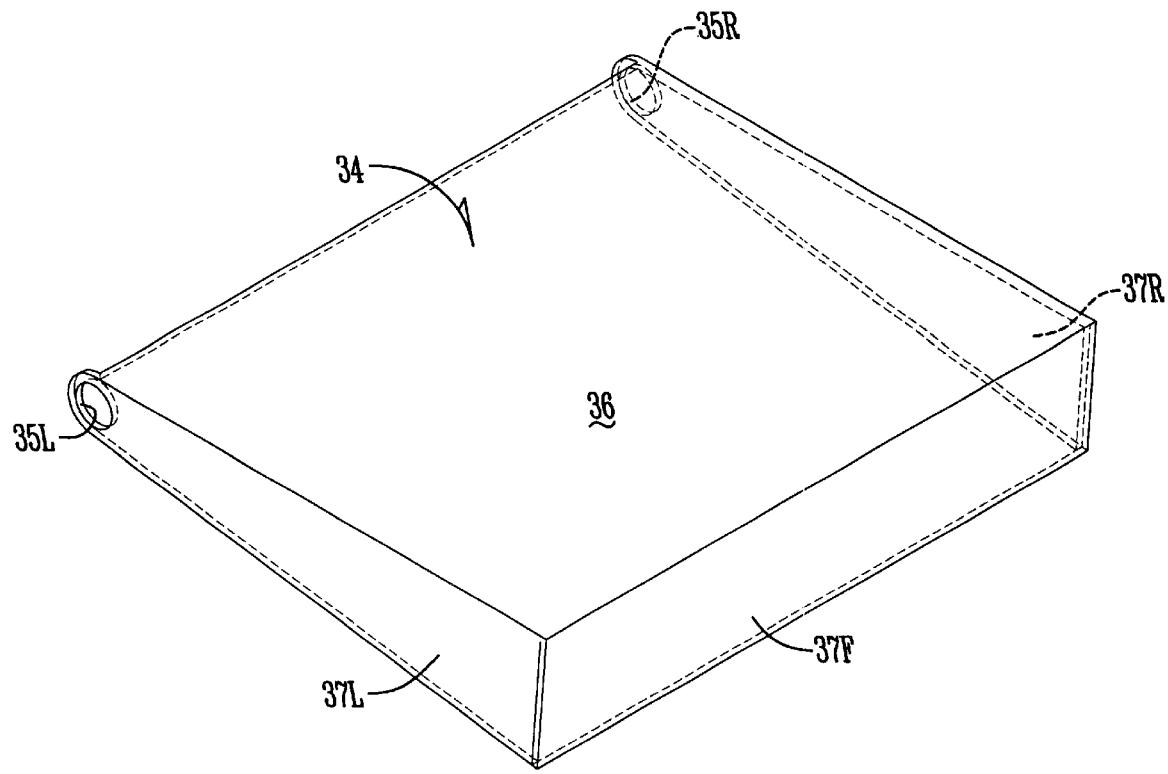
FIG. 5 is a perspective view of the baffle plate member of this invention .

An adjustable stop 50 attaches to the housing 46 and extends into the path of the handle 46. The adjustable stop 50 includes a mounting bracket or strap 52 rigidly attached by welding or other conventional means to the exterior of the housing 26. The bracket 52 has a hole 54 adjacent its forward end. The adjustable stop 50 further includes an L-shaped stop member 56. The stop member 56 preferably has a short leg 58 and an elongated leg 60 that extends at a right angle to the short leg 58. The elongated leg 60 has a series of longitudinally spaced adjustment holes 62 extending therethrough, as best seen in FIG. 4. A bolt 64 and wing nut 66 connects the stop member 56 to the bracket 52 so as to provide adjustment of the protrusion of the stop member, and thereby the position of the handle 46. Thus, the adjustable stop 50 adjustably positions the baffle 34 within the housing 26. The series of adjustment holes 62 provides adjustment in fixed intervals. However, the adjustment holes 62 could be replaced by a single elongated slot 62A, as shown in FIG. 4A. Such an arrangement provides infinitely variable adjustment of the position of the baffle 34.

A product deflector shield 68 rigidly attaches to the interior of the housing walls 12 and 24. The shield 68 extends around the pivot shaft and baffle 34 so as to prevent the particulate product, foreign material or debris from clogging the critical pivot area. The shield 68 could be pivotally attached to the housing 26 adjacent the top access panel 22 without detracting from the invention.

In use, the baffle 34 of the cushion box 10 has two extreme positions and a range of motion as illustrated in FIG. 1. In the fully lowered position, the front 37F and sides 37L, 37R of the baffle plate member rest against the panel 16 as shown. Particulate product strikes the baffle plate top 36 and accumulates thereon to cushion the subsequent particulate product that flows through the housing 26. FIG. 1 also shows the fully raised or full open position of the baffle 34. To move the baffle 34 into this position, the user uses the handle 46 to apply an external force to the pivot shaft 38 sufficient to overcome the biasing force of the spring 48. Once the user moves the handle 46 to the full open position, the spring 48 keeps the handle biased in that position. In the full open position, the baffle 34 is essentially inoperative because it is retracted from the path of the particulate material flowing through the housing 26. By removing the access panel 22, the user can remove any foreign material or debris and clean the interior of the housing 26, including the baffle 34.

Figure 1A:
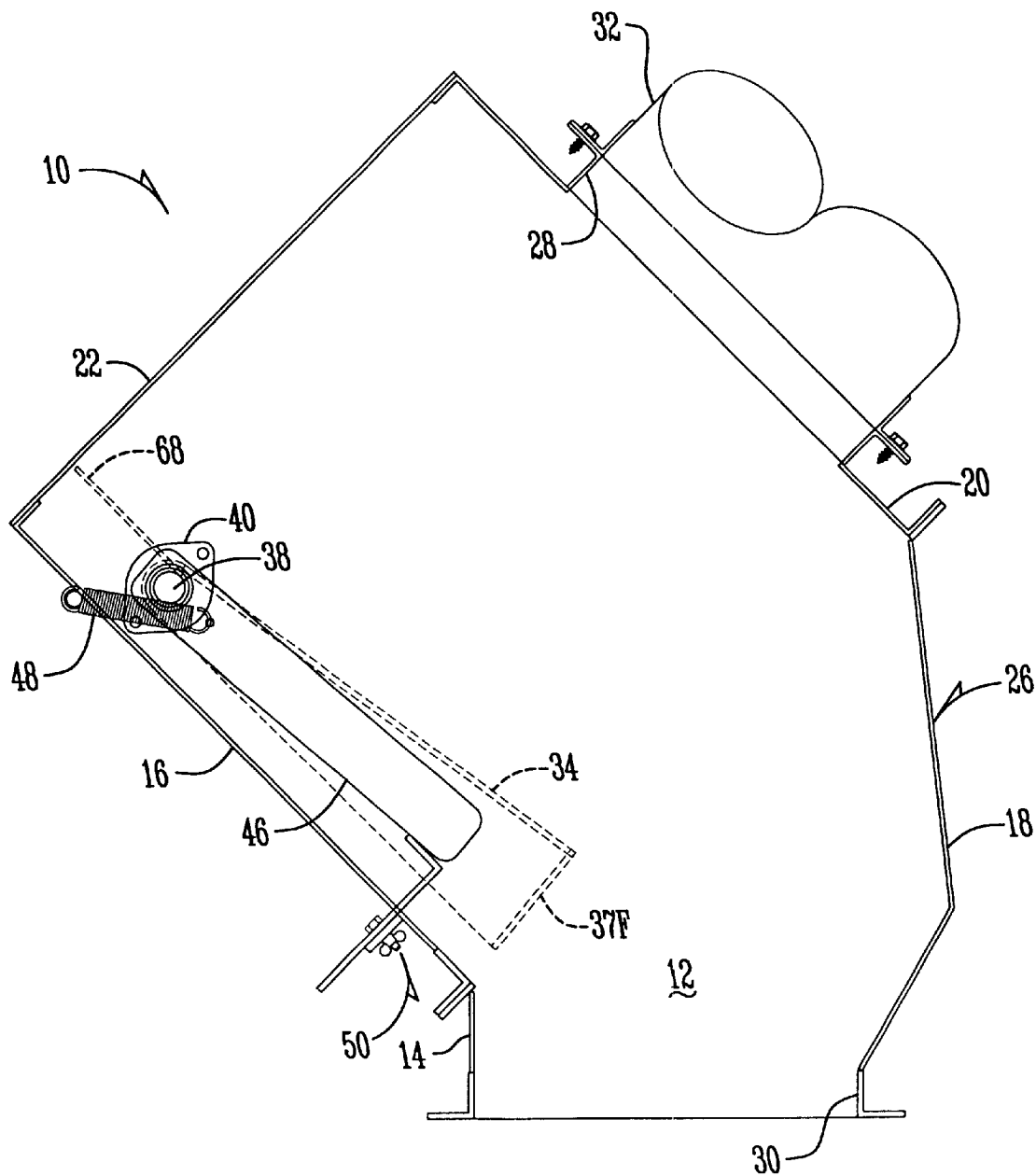
FIG. 1A is similar to FIG. 1 but shows the baffle member in a bypass flow position.

FIG. 1A illustrates that the baffle 34 is selectively movable into one of a plurality of intermediate positions by adjusting the adjustable stop 50 below the handle 46. The particular position of the baffle 34 is a bypass flow position. The baffle position shown in FIG. 1A is referred to as a bypass flow position because a small portion of the particulate product is allowed to pass around the sides 37L, 37R, front 37F, and under the baffle 34. This allows the product accumulated on the top 36 of the baffle plate member to be continuously refreshed and replenished, thereby reducing product damage that might be caused by continuously impacting on the same accumulated product.

The movable baffle 34 restricts the flow of particulate product through the cushion box 10 and creates a dam of sorts. This dam accumulates some product inside the cushion box 10 to cushion subsequently delivered product. The results are less product damage, as well as reduced wear of the spouting arrangement. In some applications, more than one cushion box can be used to slow the product down. Spouting can be vertical or at any angle that still allows the product to flow by gravity.

Although the preferred embodiment described above included a manual means (handle) for manually pivoting the pivot shaft 38 and the baffle 34, other means are possible, including but not limited to electric, hydraulic or air powered means.

Thus, it can be seen that the present invention achieves its stated objectives.

In the drawings and specifications, there has been set forth a preferred embodiment invention, and although specific terms are employed, these are used in a generic and descriptive sense only and not for purposes of limitation. Changes in the form and proportion of parts as well as in the substitution of equivalents are contemplated as circumstances may suggest or render expedient without departing from the scope of the invention as defined in the following claims.

What is claimed is:

1. A cushion box device for adjustably cushioning particulate products delivered by a spout comprising:

a hollow tubular housing having an inlet opening therein for receiving particulate products and an outlet opening therein for discharging particulate products, the inlet opening being adapted to connect to the spout and the outlet opening being disposed below the inlet opening;

a movable baffle pivotally mounted in the housing;

means connected to the baffle for moving the baffle into a plurality of pivotal positions within the housing;

the baffle being located in the housing such that in some of the pivotal positions an outer portion of the baffle extends partially between the inlet opening and the outlet opening so as to cushion particulate products delivered by the spout;

the baffle comprising a baffle plate member secured to a pivot shaft rotatably mounted to the housing, and including a substantially planar top, opposing sides, and a front, the opposing sides and front extending downwardly from the top;

the opposing sides each have a rear portion thereof with a hole formed therethrough for slidably receiving the pivot shaft, the pivot shaft having a first end that extends externally with respect to the housing and the means for moving the baffle comprises a manual means including an elongated control arm having opposite first and second ends, the first end being drivingly secured to the first end of the pivot shaft; and a spring operatively interconnecting the housing and the baffle so as to spring bias the baffle against movement away from a pair of angularly spaced extreme positions of the plurality of positions in the absence of an external force.

2. The device of claim 1 wherein the spring is a tension spring having a first end connected to the handle at a first point offset from the pivot shaft and a second end connected to the housing at a second point offset from the pivot shaft.

3. The device of claim 1 comprising an externally adjustable stop mounted on an exterior surface of the housing for establishing a maximum position of rotation for the second end of the control arm and thereby the baffle.

4. The device of claim 1 wherein the baffle has a raised fully opened pivoted position in which no portion of the baffle intersects a straight line connecting the inlet opening with the outlet opening.

5. The device of claim 1 wherein the baffle has a lowered bypass flow position in which the outer portion of the baffle extends under a downward vertical projection of the inlet opening.

6. The device of claim 1 wherein the baffle has a fully lowered position in which an interior wall of the housing engages and supports the baffle.

7. The device of claim 1 wherein the baffle being sized, shaped, and located within the housing such that in some of the positions a portion of the baffle extends partially between the inlet opening and the outlet opening so as to cushion particulate products delivered by the spout.

8. A cushion box device for adjustably cushioning particulate products delivered by a spout, comprising, a hollow housing having a top with first and second side walls extending downwardly and outwardly therefrom, a lower wall extending in a direction downwardly and inwardly from a lower edge of the second side wall and in a direction substantially opposite to and parallel to the first side wall, an inclined inlet spout in the first side wall in communication with the housing and having a center axis substantially perpendicular to the second side wall, an outlet opening in the housing below the inlet spout and adjacent to a lower edge of the second side wall and having a substantially vertical center axis at an angle with respect to the center axis at an angle with respect to the center axis of the inlet spout whereby particulate material flowing into the housing through the inlet spout would normally move directly towards the first side wall and not directly through the outlet opening, a flat baffle having a rear edge and a front edge and being pivotally mounted in the housing along a horizontal axis adjacent a horizontal intersection of lower and upper edges, respectively, of the second side wall and the lower wall, the baffle plate being pivoted between a lower position parallel to the lower wall to an upper position parallel to the second side wall and being positioned to dwell in the path of particulate material flowing into the housing through the inlet spout except when being pivoted to an upper position adjacent the second side wall, and means for fixedly adjusting the angular position of the baffle within the housing.

\* \* \* \* \*